May 27, 1958 W. R. JOHNSON 2,836,650
SINGLE CHANNEL MULTIPLEX FOR WIDEBAND REPRODUCTION
Filed Oct. 31, 1956
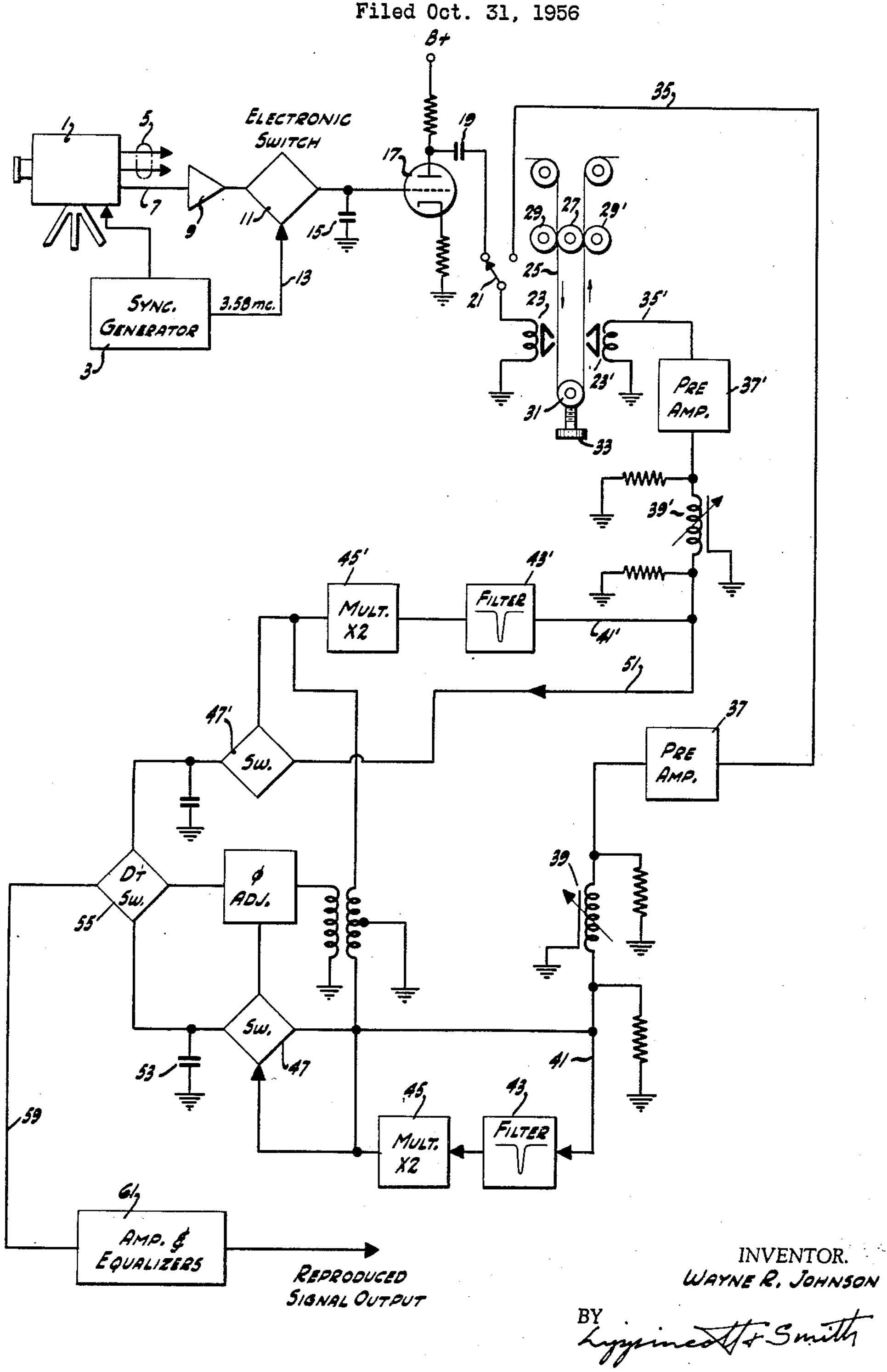
INVENTOR.
WAYNE R. JOHNSON
BY Lippincott & Smith
ATTORNEYS 2,836,650
Patented May 27, 1958

2,836,650

SINGLE CHANNEL MULTIPLEX FOR WIDEBAND REPRODUCTION

Wayne R. Johnson, Los Angeles, Calif., assignor to Minnesota Mining and Manufacturing Company, St. Paul, Minn., a corporation of Delaware Application October 31, 1956, Serial No. 619,458

9 Claims. (Cl. 178—6.6)

This invention relates to the recording on and reproduction from a moving recording medium, such as a magnetic tape, of signals, occupying a wide frequency band. The method here described is particularly adapted for use in the recording and reproduction of television signals and is applicable to similar use in the recording and reproduction of radar signals or, in fact, any signals resulting from the scanning of a field of view in two directions at a constant repetition rate. Because the invention finds its widest field of use in connection with television signals, and its application to other fields should be evident to those skilled in the art from the description of its application to television, the description and discussion that follow will be confined to the television recording field, but this is not intended as a limitation on the scope of the invention.

The difficulties encountered in recording and reproducing television images stem primarily from the very large amount of information that must be transmitted in a very short time. Under present United States standards, scanning of the field of view is accomplished at a rate of 30 frames per second, each frame being scanned in 525 lines, and the resulting signal occupies a frequency band theoretically extending from direct current or zero frequency to 4 mc. per second. Using the most refined recording methods now available it is possible to record up to about 10,000 cycles per inch of tape, with possibilities in sight of exceeding this. Taking the 10,000 cycles per inch figure as a reference, however, this requires a tape speed of 400 inches per second if the entire information is to be recorded on a single track. This involves the use of a vast length of tape for the recording of a picture lasting 15 minutes. The weight and inertia of the reels on which the tape is stored of themselves introduce problems of handling and instrumentation that make the use of direct recording difficult, quite aside from the cost of the recording medium itself.

Accordingly, there have been developed a number of systems of "bandsplitting" whereby the maximum frequencies to be recorded on a single track are reduced by a factor of 2 or more. Certain such procedures are disclosed in prior applications and issued patents of the present inventor, including Patent No. 2,694,748 for a Television Signal Reproducing System, issued November 16, 1954, and application Serial No. 506,817, filed May 9, 1955. These applications and patents relate to various methods of sampling the original signal at intervals to produce wave trains which, when recorded and reproduced, carry frequencies the highest components whereof are sub-multiples of the maximum frequency in the original signals. Accordingly, the tape can be progressed at a fraction of the speed required for direct recording.

It is characteristic of several of these sampling methods that they produce conjugate pairs of tracks, each track of a pair carrying information omitted from the other. This can be the case even where the frequency division is at a higher ratio than 2:1. In reproducing the signals so recorded the tracks are played back to produce wave trains which in turn are sampled to develop modulated trains of pulses which, when combined from several tracks, reproduce substantially the original signals.

It is well known that television signals contain a very large amount of redundant information. Even when there is apparently a large amount of motion in the field of view scanned, the signal from each succeeding frame is usually very nearly an exact repetition of that resulting from the scanning of the preceding frame. Accordingly, if the sampling frequency is so chosen that parts of the field that are not represented by a sample taken in one scanning are sampled in the succeeding scanning, the points omitted in the reproduction of the first field will be supplied in the reproduction of the following one and hence owing to the persistance of vision the entire picture will appear to be presented from a single track that contains only half the information required to present the entire field. If the sampling rate chosen is an odd multiple of one-half of the field repetition rate, this effect can be produced, it being noted that a rate that is an odd multiple of one-half the line repetition rate is necessarily an odd multiple of one-half of the field rate.

A "dot interlace" system of the sort just described is satisfactory for some purposes, but the resultant reproduced television images are difficult and unpleasant to watch. Individual dots or elemental areas of the field flicker at one-half the field rate, or at 15 cycles per second. This is within the limit that can be appreciated by the eye, particularly in the highlights of the reproduced images, with the result that the field "crawls" in an unpleasant fashion. In order to present a picture that will satisfy the general public it is necessary, where bandsplitting methods of the kind referred to are used, to reconstitute a signal that is at least the equivalent visually of the combined signals from two tracks.

One of the difficulties encountered in combining the signals from two tracks is "flutter" which results from vibration in its own plane, of the tape on which the signals are recorded, resulting in relative advance and retardation of the signals of one track with respect to those on the other. Such flutter has little effect on the phase of a signal recorded in a track running along the center of the tape, but one on either side of the center will advance or retard in phase with respect to the central track, the amount of advance or retardation depending upon the lateral spacing of the two tracks. Furthermore, owing to mechanical misalinement between the recording and pick-up or playback transducers, there may be a constant phase difference superposed on the variable phase relationship, this constant phase difference being known as "skew."

The present invention is designed to avoid the difficulties above enumerated. Among its objects are to provide a method of recording and reproducing signals, employing a bandsplitting technique, wherein substantially the entire information comprised in a single frame of the original signal can be recorded on and reproduced from a single track. From another point of view, an object of the invention is to provide a bandsplitting method of recording and reproduction which avoids all difficulties traceable to flutter or skew. Another object of the invention is to provide a method of reproduction of signals from a single track which requires a minimum of apparatus in the recording process (sampling equipment for one channel only of the particular bands to be recorded) and a minimum of equipment in the reproducing channel. Still another object is to provide a method of reproduction that is applicable to any bandsplitting system wherein information as to alternate elements of a picture field is transmitted in successive frames.

In accordance with the present invention the signals to be reproduced are recorded, on a medium moving at constant speed, by any of the sampling methods that result in a 2:1 reduction of the maximum frequency comprised in the band to be recorded and reproduced, the sampling frequency being an odd harmonic of the frame repetition frequency, so that like epochs of the frame period are separated, along the track, by equal distances. In reproduction the signal as recorded is picked up from two points spaced along the track by substantially this constant distance; according to one modification of the invention the mechanical spacing of the pick-up points can be adjusted to exactly the required distance while in a second modification of the method the pick-up points can be only approximately spaced and the signal that is more advanced in epoch may be delayed until the two played-back signals are in the same time relation to the instant of initiation of successive frames. In either case two trains of signals are developed bearing the desired phase relationship. These two signals are then alternately sampled to produce two trains of pulses, modulated in amplitude to represent alternate elementary areas of the picture field, following which the two pulse trains are combined to produce a signal carrying substantially all of the information of each frame.

The detailed description of a preferred embodiment of the invention which follows is illustrated by the accompanying drawings, wherein:

The single figure is a diagram, partly schematic and partly in block form, illustrating the equipment for recording and reproducing signals of the character described.

The drawing illustrates only equipment involved in the recording and reproducing of a single high-frequency channel. The channel shown could be that carrying the entire information desired from scanning a field for monochrome reproduction, or it could be either the luminance signal used in transmitting a color picture in accordance with present standards or the "mixed high" components of such a picture. In any case additional channels would be required. For monochrome a separate channel would be used for carrying the accompanying sound, and, in accordance with some systems, a pilot or synchronizing frequency would be superimposed upon the sound signal for maintaining the average speed of the tape constant. In transmitting color pictures additional tracks would be required for carrying the chrominance information; as only the low frequency components of such information are transmitted this information can be recorded directly. The requirements for synchronization here are not as rigorous as those for the interlace of the picture elements in the high-frequency range and therefore these components can be carried by tracks positioned on the tape on either side of the high-frequency track to which the method of the present invention applies.

In the showing of Fig. 1 the original signal to be operated upon is assumed to be developed by a television camera 1, supplied with its scanning, blanking and synchronizing signals from a standard sync generator 3. Assuming the camera 1 is for the transmission of color, it will supply additional channels 5, not shown in detail, as well as the channel 7 which carries the luminance signal or, perhaps a green signal plus the mixed highs. The signals in this channel, after passing through an amplifier 9, are supplied to an electronic switch 11.

Any one of a large number of switching or gating arrangements can be used for the switch 11. One suitable switch of this character is illustrated in Fig. 319, page 54, of "Waveforms," vol. 19, Radiation Laboratories Series (McGraw-Hill, 1949), and various other types of carrier-balanced, half-wave modulators can be used, provided a storage condenser is used in the output circuit as will be described hereinafter. The necessary characteristic of the switch employed is that it be phase-sensitive, the output voltage reversing in sign with reversal of the signal to be sampled. In the present instance it is driven by the color sub-carrier frequency, which under present standards of transmission is the 455th harmonic of one-half the line frequency or the 34,025th harmonic of one-half the frame frequency. This is equal to 3,579,545 cycles per second, but for convenience will be hereinafter referred to as the "3.58 mc." frequency. This frequency is available from a standard color sync generator, and is supplied to the switch 11 through lead 13. Switch 11 is so biased as to close its circuit to output lead 7′ only on the positive peaks of the 3.58 frequency, thus passing on, to its output circuit, short pulses or samples of the original TV signal every 0.28 microsecond.

The pulses thus produced charge a small condenser 15 to the instantaneous voltage of the sample, thus deriving from the original signal a related signal in which the voltage changes by successive steps, each new voltage persisting for 0.28 microsecond. The step voltage thus produced is applied to the grid of a triode 17. The amplified output from this tube is supplied through a blocking condenser 19 and a mechanical switch 21 to the winding of a transducer head 23, which imposes a signal upon tape, schematically indicated at 25.

The tape is driven at constant speed by a drive capstan 27, against which the tape is held by a pair of nip rollers 29 and 29′. In accordance with known practice the speed of the capstan and tape are held at a constant value by a feedback arrangement, not shown since various forms of such mechanisms are well known in the recording art. Neither are the reels on which the tape is carried illustrated nor the tensioning devices, and for the same reason.

The transducer head 23 used in the recording process is identical in constuction with a second transducer head 23′. After passing the capstan and the recording head 23 the tape goes around a reversing roller or guide 31 and returns between the capstan and nip roller 29′, passing, on the way, the second transducer head 23′. The transducer heads are fixed in position, but the reversing guide or roller is adjustable by means of a micrometer screw 33 so that the distance between the points of contact of heads 23 and 23′ can be made precisely equal to the distance traversed by the tape during the frame interval of substantially 1/30 second.

In the present instance it is assumed that the heads will reproduce frequencies up to one-half the 3.58 mc. sampling frequency. At 10 kc. per inch this argues a tape speed of approximately 180 inches per second and therefore the separation of the two transducer heads, as measured along the tape path, should be almost exactly six inches. Because of the very short wavelength for the maximum frequencies to be recorded, however, the exact distance to insure that the two heads contact the track at exact equal epochs of successive frames, as recorded, the adjustment, even with an extremely accurate calibrated micrometer screw is very critical. The adjustment by purely mechanical means is contemplated as within the scope of the invention, but it is preferred to make only the initial adjustment mechanically in this fashion, and to obtain a final synchronization between the signals by electrical means, as will be described later.

Although the sampling rate of the signals applied to the tape is 3.58 mc., because of the action of the storage condenser 15 the signal does not drop to zero between samples, and as a result the sampling frequency appears in the record, where it does appear, with a major component of a frequency of one-half 3.58 or 1.79 mc. per second. This component appears only when the value of illumination of the portion of the field being scanned is changing. Owing to the aperture effect of the gaps in the transducer heads, the still higher frequency components due to the successive 0.28 microsecond steps are filtered out in reproduction and therefore, on playback, the samples rise and fall gradually.

On playback the switch 21 is thrown to reverse position from that shown, so that the recording head 23 now becomes a reproducer or playback head, connected to equipment which is identical with that supplied by the head 23'. The signals played back from head 23 are supplied through lead 35 to a preamplifier 37 and thence to a variable delay-line 39. Beyond the delay-line the circuit divides; one branch of the circuit leads through connection 41 to a very narrow pass band filter tuned to the 1.79 mc. frequency; e. g., a crystal filter. This filter has a long ringing period and selects from the signals supplied to it the dominant 1.79 mc. component of the sampled waves. This component goes in turn to a 2:1 multiplier 45, maintained at the verge of oscillation so that it, too, tends to ring, giving a constant output of the 3.58 sampling frequency. The positive crests of the sampling frequency operate an electronic switch 47, which may be identical with the switch 11. Switch 47 is inserted in the second branch 51 of the delay-line output circuit; when it closes, instantaneously, it charges condenser 53 in the same manner that switch 11 charges condenser 15 as already explained.

The circuit from transducer head 23' is identical with that to which head 23 is connected for playback. The equipment in this circuit is therefore designated by the same reference characters as those just described but distinguished by accents.

The voltages developed across condensers 53 and 53' are supplied to what is, in effect, a double throw electronic switch 55. The operating potentials for this switch can be derived from either multiplier 45 or 45'. In the present case the operating frequency for the switch is derived from both multiplier 45, 45', connected in push-pull and is supplied through a phase adjuster 57 to the switch 55. The addition of the two separately derived sampling oscillations results in a sampling wave of their average phase. The switch 55 is so arranged that it closes the circuit to condenser 53 on (say) the positive peaks of the operating frequency, whereas the circuit to condenser 53' is closed on the negative peaks. Instead of a single double-throw switch at 55, two alternately operated switches of the same kind as switch 11, connected back-to-back, can be used. The resultant output is successive pulses, each one-half cycle of the switching frequency long, which are interlaced and are supplied through output lead 59 to the usual amplifier and equalizers 61. The output from the latter connects to a television transmitter or transmission line. It should be noted here that the pulsed output from switches 47 and 47' can be combined directly and supplied to amplifier and equalizers 61 without the additional storage in condensers 53, 53' and resampling, provided the adjustments of the phasing screw 33 and the delay lines 39, 39' are exact and there is no phase deviation in the sampling frequencies. The resampling techniques, however, give an additional latitude of adjustment, and using the same wave for sampling in the final step assures absolute interlace.

The sampled signals resulting from the scanning process may be considered without serious error as being recorded on the tape in their stepped form, but, as has been mentioned, in reproduction the high frequency components of the step functions are filtered out. As reproduced, the resulting steps will attain their maximum value in substantially one-half cycle of the 1.79 mc. frequency, so that if sampled during the final 0.14 microsecond of their persistance the reproduction will be at their true value. The samples are taken of alternate elementary areas of the picture field in successive frames and in order to get exact interlace, as required to present a complete and satisfactory picture, it is necessary that the signals that are present coincidentally at the switches 47 and 47' represent exactly the same phases or epochs of the scanning cycles of the two successive frames. To attain this result by mechanical adjustment of the micrometer screw 33 is possible but difficult of achievement. It is for this reason that the variable delay lines 39 and 39' are provided. Such delay lines may be adjustable through several cycles of the sampling frequency; by playing back a recorded image on a monitor it is possible to compare the phases of the signals in the two channels and, if there is any discrepancy in the mechanical adjustment, to delay the phase of the more advanced sufficiently to bring about the interlaced relationship. Furthermore, it is not necessary that the delay lines 37 and 37' be manually adjustable; in copending application Serial No. 610,436 of the same inventor, filed September 4, 1956, there is described and illustrated a method of electronically comparing the phases of two signals and delaying the more advanced to bring the two into time coincidence. This technique can be employed here if desired, although ordinarily the additional complication is not required.

One reason that it is unnecessary to use automatic and continuous adjustment of the delay lines is the fact that the resampling technique used for finally mixing the signals offers some additional latitude in sampling time. The charges on each condenser persist for 0.28 microsecond but the samples are only 0.14 microsecond long. Therefore, the final samples will interlace properly even though there may be as much as 0.14 microsecond departure from the proper phase-relationship of the signals as stored on condensers 53 and 53'. The use of the average phase of the two sampling waves insures that sampling of both channels will be accomplished as long as the 0.14 microsecond tolerance is not exceeded. Of course it is possible to derive the sampling frequencies from a separately recorded pilot channel, or from a local oscillator held in step by bursts of the color sub-carrier (divided by 2) as in the case of color receivers.

While the invention has been described in connection with one particular sampling technique that leads to recorded signals carrying one-half of the picture information per track per frame, it should be realized that this is not the only sampling technique which yields such results. Issued Patent No. 2,694,748 of the present inventor describes a sampling process in which the original signal is sampled by a process which leads to successive pulses of opposite sign; such sampling can be done, for example, in a double-balanced modulator by successive pulses of alternating sign and the resampling can be accomplished in the same manner. To record a maximum frequency of 1.79 mc. a frequency of this value would be used for the sampling, using both halves of the sampling wave. If the sampling frequency is an odd harmonic of one-half the field frequency the same technique for combining the information of two fields as is here described can be used to reconstitute the image. In applicant's copending application Serial No. 506,817, filed May 9, 1955, a somewhat different system of modulation is disclosed wherein the sampling frequency may be above the upper cut-off of the recording and reproducing equipment and sidebands recorded representing both $f$—F and F—$f'$, where $f$ represents frequencies above the carrier frequency and $f'$ frequencies below it. By a resampling process both sidebands can be reproduced, but two channels, "dot-interlaced," are required to present the entire picture. The invention here disclosed can be used with this latter method of recording also. The invention is not, therefore, dependent upon the specific method of sampling as herein described in detail, but is applicable to any system of frequency division wherein alternate picture areas, as recorded on a single track, are represented in successive fields. Hence, the specific illustration of equipment used in practicing the method is not intended to limit the scope of the invention, all intended limitations being expressed in the claims which follow.

I claim:

1. In the recording on and reproduction from a moving recording medium of electrical signals produced by scanning a field of view in two directions at frame and line repetition rates, respectively, wherein a bandsplitting method is used whereby the signals recorded on a single track represent samplings of alternate elements of said field of view containing half of the information as to the field of view scanned in each frame period, the method of reproducing substantially the entire information as to said field of view from such a single track that comprises the steps designated as steps (*a*) to (*d*) and defined as follows: step (*a*) sampling the signals resulting from scanning said field of view at a sampling rate that is an odd multiple of one-half of said frame rate; (*b*) recording signals resulting from step (*a*) on a single track; (*c*) simultaneously playing back the signals recorded in step (*b*) from two separated points along said tracks to develop two signal trains representative of signals recorded at the same epochs in the scanning of two successive frames; and (*d*) combining the information carried by said two signal trains to provide substantially all of the information comprised in the original signals from each frame.

2. In the recording on and reproduction from a moving recording medium of electrical signals produced by scanning a field of view in two directions at frame and line repetition rates, respectively, wherein a bandsplitting method is used whereby the signals recorded on a single track represent samplings of alternate elements of said field of view containing half of the information as to the field of view scanned in each frame period, the method of reproducing substantially the entire information as to said field of view from such a single track that comprises the steps designated as steps (*a*) to (*e*) and defined as follows: step (*a*) sampling the signals resulting from scanning said field of view at a sampling rate that is an odd multiple of one-half of said frame rate; (*b*) recording signals resulting from step (*a*) on a single track; (*c*) simultaneously playing back the signal recorded in step (*b*) from two separated points along said track to develop two signal trains representative of signals recorded at the same epochs in the scanning of two successive frames; (*d*) sampling said two signal trains alternately to produce two trains of pulses; and (*e*) combining said two trains of pulses to provide a signal carrying substantially all of the information comprised in each frame of the original signal.

3. In the recording on and reproduction from a moving recording medium of electrical signals produced by scanning a field of view in two directions at frame and line repetition rates, respectively, wherein a bandsplitting method is used whereby the signals recorded on a single track represent samplings of alternate elements of said field of view containing half of the information as to the field of view scanned in each frame period, the method of reproducing substantially the entire information as to said field of view from such a single track that comprises the steps designated as steps (*a*) to (*e*) and defined as follows: step (*a*) sampling the signals resulting from scanning said field of view at a sampling rate that is an odd multiple of one-half of said frame rate; (*b*) recording signals resulting from step (*a*) on a single track; (*c*) simultaneously reproducing the signals recorded in step (*b*) from two points on said track separated by the distance traversed by said medium in one period of said frame rate; (*d*) alternately sampling the two signals reproduced in step (*c*); and (*e*) combining the samples so reproduced from successively recorded frames to provide substantially all of the information comprised within a single frame.

4. In the recording on and reproduction from a moving recording medium of electrical signals produced by scanning a field of view in two directions at frame and line repetition rates, respectively, wherein a bandsplitting method is used whereby the signals recorded on a single track represent samplings of alternate elements of said field of view containing half of the information as to the field of view scanned in each frame period, the method of reproducing substantially the entire information as to said field of view from such a single track that comprises the steps designated as steps (*a*) to (*f*) and defined as follows: steps (*a*) sampling the signals resulting from scanning said field of view at a sampling rate that is an odd multiple of one-half of said frame rate; (*b*) recording signals resulting from step (*a*) on a single track; (*c*) simultaneously playing back the signals recorded in step (*b*) from two points on said track separated by substantially the distance traversed by said medium in recording a single frame period to produce two signal trains representative respectively of the information recorded at substantially equal phases in the scanning of two successive frames; (*d*) comparing the relative phases of the two signal trains produced in step (*c*) to determine any discrepancy therein; (*e*) delaying the more advanced of said signal trains to bring it into exact relative phase with the other; and (*f*) adding the information from said two signal trains to produce from two successive frames substantially the entire information comprised in a single frame.

5. The method of reproducing television signals recorded on a moving medium by a procedure wherein the information derived from cyclically scanning a field of view at a constant frame-repetition frequency is sampled at a constant rate to produce a recorded wave train on a single track, the maximum frequency components whereof are one-half the maximum frequency of the original signals, the sampling of the original signals being so timed that the samples taken in each frame are representative of portions of said field of view between the portions sampled in the preceding frame, which comprises the steps designated as steps (*a*) to (*d*) and defined as follows: step (*a*) progressing said recording medium at a constant speed; (*b*) simultaneously playing back the signals recorded on said medium from two points separated by a distance along said track such as to produce two wave trains representative of the scanning of identical elementary areas of said field of view in two successive frame periods; (*c*) sampling said two wave trains alternately to produce two pulse trains, the pulses in each train corresponding in amplitude to the illumination of alternate elementary areas of said field of view; and (*d*) combining said pulse trains to reconstitute substantially the original signal.

6. The method of reproducing television signals recorded on a moving medium by a procedure wherein the information derived from cyclically scanning a field of view at a constant frame-repetition frequency is sampled at a constant rate to produce a recorded wave train on a single track, the maximum frequency components whereof are one-half the maximum frequency of the original signals, the sampling of the original signals being so timed that the samples taken in each frame are representative of portions of said field of view between the portions sampled in the preceding frame, which comprises the steps designated as steps (*a*) to (*d*) and defined as follows: step (*a*) progressing said recording medium at a constant speed; (*b*) simultaneously playing back the signals recorded on a single track on said medium from two points spaced therealong to develop two signal trains representative respectively of the signals recorded in the same relative epochs of the scanning of said field of view in two successive frame periods; (*c*) sampling said two wave trains alternately to produce two pulse trains, the pulses in each train corresponding in amplitude to the illumination of alternate elementary areas of said field of view; and (*d*) combining said pulse trains to reconstitute substantially the original signal.

7. In a process of tape-recording and reproducing signals representative of repetitive bi-dimensional scannings of a field of view at frame and line scanning rates, wherein a bandsplitting method is employed that requires two trains of signals modulated in different phase relation on a common carrier frequency to convey the complete information carried by the original signal, the method that comprises the steps designated as steps (a) to (e) and defined as follows: step (a) generating a carrier frequency oscillation that is an odd harmonic of said line scanning frequency; (b) modulating the original signals to be recorded on said carrier to accomplish the band-splitting operation, thus producing a train of signals carrying one-half of the information carried by the original signals; (c) recording the train of signals resulting from step (b) as a single record track on a tape moving at a constant speed; (d) simultaneously playing back the signals recorded in step (c) from two positions on said track, separated by a distance equal to the distance therealong through which said tape is progressed in one period of said frame frequency; and (e) mixing the information carried by the simultaneously played-back signals to produce a composite signal carrying substantially the entire information of the original signal.

8. In a process of tape-recording and reproducing signals representative of repetitive bi-dimensional scannings of a field of view at frame and line scanning rates, wherein a bandsplitting method is employed that requires two trains of signals modulated in different phase relation on a common carrier frequency to convey the complete information carried by the original signal, the method that comprises the steps designated as steps (a) to (f) and defined as follows: step (a) generating a carrier frequency oscillation that is an odd harmonic of said line scanning frequency; (b) modulating the original signals to be recorded on said carrier to accomplish the band-splitting operation, thus producing a train of signals carrying one-half of the information carried by the original signals; (c) recording the train of signals resulting from step (b) as a single record track on a tape moving at a constant speed; (d) simultaneously playing back from said single track the wave train recorded thereon from two points spaced apart therealong by the distance traversed by said tape in one period of said frame frequency; (e) separately demodulating the two simultaneously reproduced wave trains to recover the information modulated thereon as separate signals; and (f) adding said separate signals to reconstitute substantially the entire information comprised in the original signals.

9. In a process of tape-recording and reproducing signals representative of repetitive bi-dimensional scannings of a field of view at frame and line scanning rates, wherein a bandsplitting method is employed that requires two trains of signals modulated in different phase relation on a common carrier frequency to convey the complete information carried by the original signal, the method that comprises the steps designated as steps (a) to (d) and defined as follows: step (a) simultaneously playing back the wave train recorded on said single track from two points therealong separated by substantially the distance traversed by said tape in one period of said frame frequency to produce simultaneously trains of signals produced in scanning two successive frames; (b) separately demodulating each of said two trains of signals to recover the information modulated thereon; (c) delaying the demodulated information from the more advanced of said trains of signals to bring the information developed from the two trains of signals into interlaced time-relationship; and (d) adding the information from the two signal trains to produce a complete signal.

No references cited.